United States Patent [19]

Lewis et al.

[11] Patent Number: 5,319,067

[45] Date of Patent: Jun. 7, 1994

[54] POLYKETONE ELASTOMER

[75] Inventors: Charles M. Lewis, Springfield, Mo.; Nasser Pourahmady, Avon Lake, Ohio

[73] Assignee: Dayco Products, Inc., Dayton, Ohio

[21] Appl. No.: 873,662

[22] Filed: Apr. 23, 1992

Related U.S. Application Data

[62] Division of Ser. No. 597,985, Oct. 15, 1990, abandoned, which is a division of Ser. No. 297,217, Jan. 17, 1989, Pat. No. 4,983,705.

[51] Int. Cl.$^5$ ............... C08G 4/00; C08G 16/00
[52] U.S. Cl. ............................. 528/220; 528/170; 528/229; 528/321; 528/322; 528/367
[58] Field of Search ............... 528/220, 229, 321, 322, 528/367, 170

[56] References Cited

U.S. PATENT DOCUMENTS 4,983,705  1/1991  Lewis et al. ............... 528/170

Primary Examiner—Harold D. Anderson
Attorney, Agent, or Firm—Joseph V. Tassone

[57] ABSTRACT

A thermoplastic polymer having a repeating unit of the formula (I), (II), or (III):

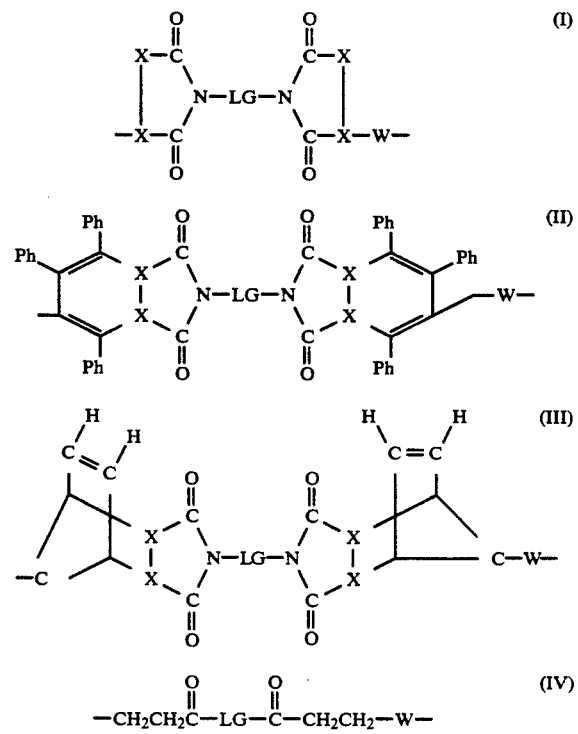

where LG is a linking group and W is an oligomeric chain selected from the group consisting of polyether, a polythioether, a polyetherthioether, polycarbonyl, or polysulfonyl, or a copolymer thereof.

6 Claims, No Drawings

POLYKETONE ELASTOMER

This is a division of co-pending application Ser. No. 07/597,985, filed Oct. 15, 1990, now abandoned which is a division of U.S. application Ser. No. 07/297,217, filed Jan. 17, 1989 now U.S. Pat. No. 4,983,705.

BACKGROUND OF THE INVENTION

The present invention relates to thermoplastic polyimide and polyketone elestomers which are characterized by high temperature resistance and high fuel, oil and chemical resistance. These elastomers are particularly useful in the automotive industry where they may be used to mold hydraulic hose, pulleys, brackets, engine mounts and the like.

Polyimides and polyketones are known in the art, but previous polymers do not have the thermal and chemical resistance required for many uses particularly uses in the automotive industry where the temperature requirements for many engine accessories have increased dramatically in recent years.

Polymers formed by Michael (nucleophilic) addition of a bismaleimide are known in the art. White, J. E. et al., "Reactions of Diaminoalkanes with Bismaleimides: Synthesis of Some Unusual Polyimides,"*J. Appl. Poly Sci.*, 29, 891–99 (1984) discloses that polyimide elastomers can be obtained by reacting diaminoalkanes having flexible backbones with aliphatic and aromatic bismaleimides. Examples of the diaminoalkanes are 1,8-diaminooctane, N,N-dimethyl-1,6-hexanediamine.

U.S. Pat. No. 3,741,942 to Crivello (1973) teaches a polyimide obtained by reaction of a bismaleimide and a dithiol.

Bismaleimides have also been used to crosslink unsaturated rubbers as described in U.S. Pat. No. 2,989,504 to Little (1961), and they have been reacted with diamines by Michael addition in making fibers and molded articles as described in U.S. Pat. No. 2,818,405 to Kovacic (1957), U.S. Pat. No. 3,658,764 to Lyon (1972), U.S. Pat. No. 3,767,626 to Bron (1973), and U.S. Pat. No. 3,878,172 to Bargain et al. (1975), and re 29,316 to Bargain et al. (1976).

U S. Pat. No. 3,738,967 to Crivello (1973) teaches that polyimides can also be prepared by a nucleophilic addition reaction of a bismaleimide and hydrogen sulfide. These polyimides are disclosed as being useful in molding, insulation, and coating. Another class of polyimide is obtained by reacting a bismaleimide with a diamine and then a sulfide or dithiol according to U.S. Pat. No. 3,766,138 to Crivello (1973).

SUMMARY OF THE INVENTION

A principal object of the present invention is to provide a thermally stable thermoplastic elastomer.

A still further object of the present invention is to provide thermally stable automotive accessories which are prepared using the elastomers described herein.

Another object of the present invention is to provide a process for reaction injection molding wherein the bismaleimide, biscitraconimide, bistriazolinedione, or bisvinylketone terminated prepolymers described herein are reacted with a dinucleophile to prepare articles of the temperature resistant elastomers described herein.

These and other objects are achieved in the present invention which provides:

A thermoplastic elastomer having one of the following repeating units:

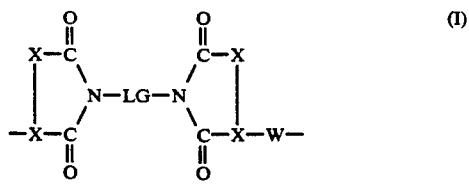  (I)

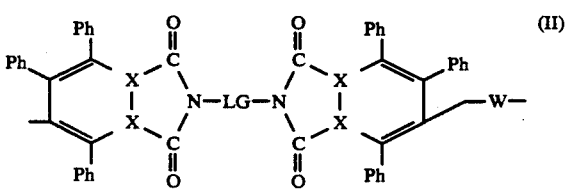  (II)

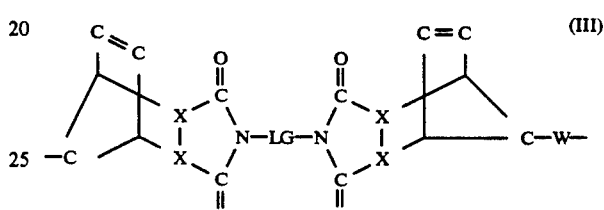  (III)

  (IV)

where W is a divalent member derived from a polyether, polythioether, polyehterthioether, polycarbonyl, or a copolymer thereof; and more particularly

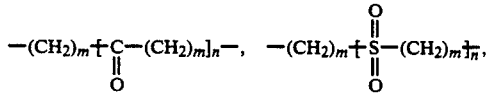

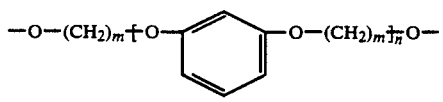

and

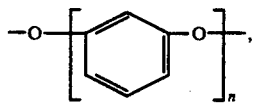

where
x is a carbon or nitrogen atom and when
x is a carbon atom, one carbon atom may be substituted by a methyl group;
m is 1 to 12 and preferably 4 to 12;
n is 1 to 5; LG is a linking group and preferably a group of the formula:

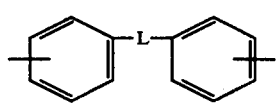

where L represents a flexible linking group and more particularly a group having one of the following structures:

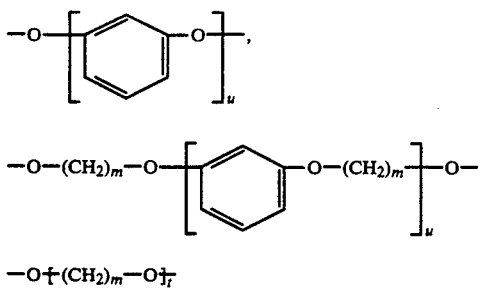

where u is 1 to 7 and preferably 1,3, or 7; t is 1 to 5 and preferably 1 or 3; m is 1 to 12 preferably 4 to 12.

W may range from about 500 to 6,000 in molecular weight. It can be an aliphatic polyether, polythioether, polyetherthioether, or a poly-metaphenylether. W may also represent a co-polymer of two or more of these moieties.

The elastomers of the present invention are prepared from bismaleimide, biscitraconimide. bistriazolinedione, and bisvinylketone terminated oligomeric prepolymers of one of the following formulas.

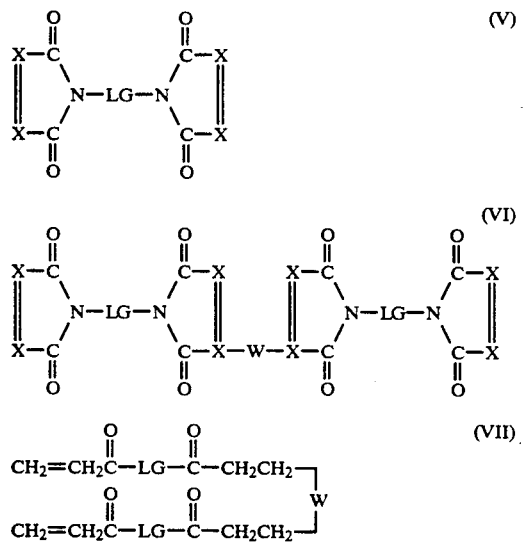

A temperature and chemically resistant thermoplastic elastomer prepared by reacting a bismaleimide, biscitraconimide, bistriazolinedione, or bisvinylketone terminated prepolymer of the formulas (V)–(VII) with a dinucleophile in a Michael Addition or a Diels Alder Addition polymerization.

DETAILED DESCRIPTION OF THE INVENTION

Temperature resistant elastomeric polymers in accordance with the present invention are prepared by reacting any of the prepolymers of formulas (V)–(VII) above with a dinucleophile in a Michael addition or Diels Alder reaction in a conventional manner. The reaction may be carried out in a twin screw extruder if desired.

Formula (V) represents bismaleimides, biscitraconimides and bistriazolinediones which are liquid under the reaction conditions. Due to the symmetry of bismaleimides there is a tendency for them to be crystalline solids. In accordance with the present invention, however, the compounds are designed with a flexible linking group L between the maleimide moieties which places a sufficient internuclear distance between the rings and provides sufficient flexibility to the molecule that the compounds are liquid under the reaction conditions.

In order to provide sufficient flexibility and internuclear distance in prepolymers of the formula (V), L is preferably an aromatic ether group, an aliphatic ether group or an aromatic ether group alternating with short aliphatic chains. The aliphatic chains between ether linkages preferably having 4 to 12 carbon atoms. The aromatic ether preferably includes a meta substituted phenylene as opposed to a para substituted phenylene because meta substitution provides substantially lower melting points and much greater flexibility to the linking group.

A second approach to designing prepolymers is to end cap a high termperature resistant liquid prepolymer with a low molecular weight bismaleimide, biscitraconimide, bistriazolinedione or bisvinylketone. Prepolymers in accordance with this embodiment of the invention are represented by the formulas (VI) and (VII).

Selection of the dinucleophile will depend to a large degree on the nature of the prepolymer. Where the prepolymer is a relatively low molecular weight compound of the formula (V), higher molecular weight dinucleophiles may be used. On the other hand, where the prepolymer is a higher molecular weight prepolymer of the formula (VI) or (VII), a lower molecular weight dinucleophile will be selected.

Dinucleophiles useful in providing thermoplastic elastomers by RIM processing can be more particularly represented by formulas

Where R is a lower alkyl group (e.g., an alkyl group containing 1 to 4 carbon atoms), and W' is an aromatic or aliphatic polyether, an aliphatic polythioether, an aliphatic polyetherthioether or a co-polymer of aromatic and aliphatic polyethers or polythioethers which preferably do not sustantially degrade upon heating to temperatures of at least 350° F. and more preferably at least 400° F. More particularly W' can be represented by the formulas (X)–(XII).

Here $R^1$, $R^{2,}$ and $R^3$ represent straight or branched chain alkylene or arylene groups having 2 to 12 carbon atoms, x is a function of the total molecular weight divided by the molecular weight of the repeating units. The total molecular weight is most generally between 500 and 6000 and x is typically between 2 and 70. As a general rule, the dinucleophiles vary in reactivity as follows: aromatic primary amines greater than aliphatic primary amines, primary amines greater than secondary amines. Mercaptans are very slow to react. Consequently, when they are used a tertiary amine such as quinuclidine or triethyldiamine is added as a catalyst. Triethylamine may also be used as a catalyst but it tends to be too volatile. All of the following dinucleophiles have been used for W.

Representative examples of dinucleophiles are provided in the following table.

TABLE

1. 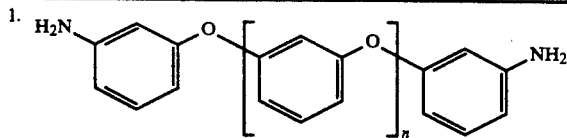

Where n = 1 to 9

2. 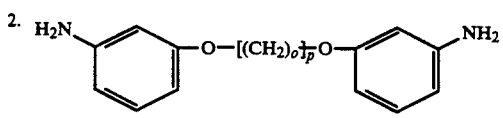

3. 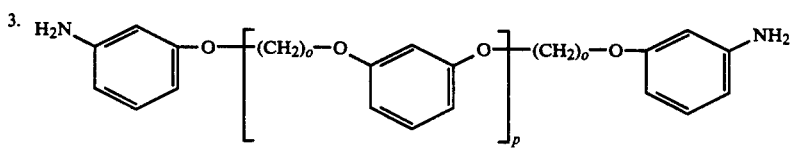

4. 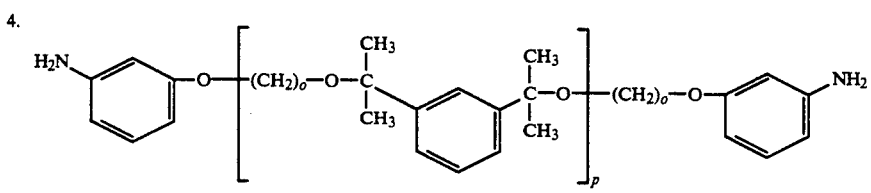

Where o = 2 to 12
p = 1 to 9

5. 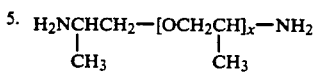

| Product | X | Mol. Wt. |
|---|---|---|
| D-230 | 2-3 | 230 |
| D-400 | 5-6 | 400 |
| D-2000 | 33 (Avg.) | 2,000 |
| D-4000 | 68 (Avg.) | 4,000 |

JEFFAMINE ED-Series (Texaco Corp.)

6. 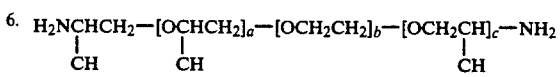

| Product | b | a+c | Mol. Wt. |
|---|---|---|---|
| ED-600 | 8.5 | 2.5 | 600 |
| ED-900 | 15.5 | 2.5 | 900 |
| ED-2001 | 40.5 | 2.5 | 2,000 |
| ED-4000 | 86.0 | 2.5 | 4,000 |
| ED-6000 | 131.5 | 2.5 | 6,000 |

7. UNILINK 4200 (U.O.P. Corp.)

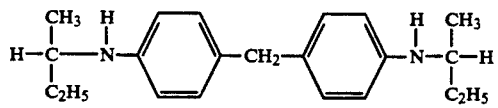

8. UNILINK 4100 (U.O.P. Corp.)

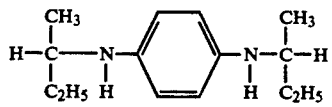

9. UNILINK XPA SERIES (U.O.P. Corp.)

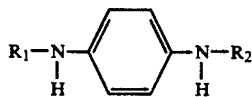

TABLE-continued

| MATERIAL CODE | R₁ | R₂ |
| --- | --- | --- |
| XPA-23 | C'₈ | C'₈ |
| XPA-24 | C₈ | C₈ |
| XPA-28 | phenyl | phenyl |

WHERE:

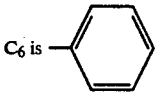

11. BIS-ANILINE M (4,4'-bisaminocumyl m-benzene available from Mitsui Petrochemicals)
12. DYTEK ™ A (2-methylpentamethylenediamine Du Pont)
13. BHMT (bis-hexamethylenetriamine Du Pont)
14. C₁₂ DIAMINE (1,12-dodecanediamine Du Pont)
15. DPTA (dipropylenetriamine Du Pont)

W can also be formed from any of the polythioethers described in U.S. Pat. No. 4,366,307 to Singh et al. which is incorporated herein by reference.

These prepolymers react with dinucleophiles by a Michael addition or Diels Alder addition to afford the elastomers. The prepolymer is preferably a free flowing liquid below 250° F.

The dinucleophile and/or the prepolymer may be a blend to control the reaction and the properties of the elastomer which is produced. It was recognized early during our research that a blend of dinucleophiles would be needed to realize all of the property requirements for certain automotive products. The dinucleophiles were selected on a temperature resistance and elastomeric tendency basis, i.e., a dinucleophile is selected which does not introduce thermally unstable units, but does introduce flexible elastomeric units into the polymer.

The Texaco Jeffamines are very long polyaliphaticether molecules which make up the bulk of the polymer. They are elastic, very flexible, and very soft. The D series are diamines which promote linear chain growth.

It was also discovered that bismaleimides, biscitraconimides, and bisvinylketones could also be blended to control the rate or kinetics of the polymerization reaction and the properties of the elastomer. It also provided a convenient means to introduce hard segments or tough segments into the polymer. Biscitraconimides react slower than bismaleimides with dinucleophiles and impart a resilience to the polymer because of its pendent methyl group. Bistriazolinediones and bisvinylketones react much more rapidly with dinucleophiles than bismaleimides and provide a means to increase the rate of reaction. Bisvinylketone linkages are not ring structures, therefor they are more flexible than the maleimide, citraconimide, or triazolinedione structures. Examples of the most useful bismaleimide, biscitraconimide, bistriazolinedione, and bisvinylketone used are:

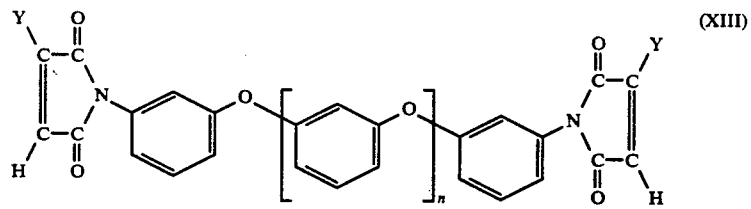

(XIII)

Where: n = 1 to 5

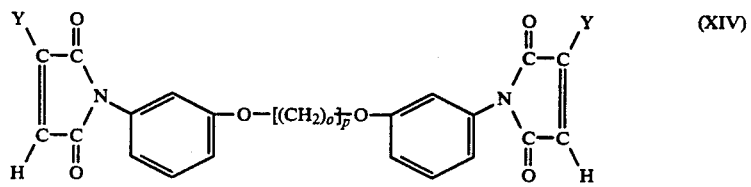

(XIV)

Where o = 6 and 9
p = 1, 3, and 5
y = H or methyl group

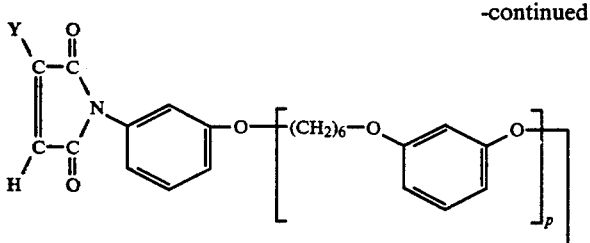

(XV)

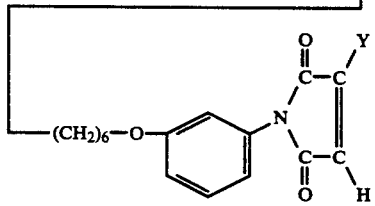

(XVI)

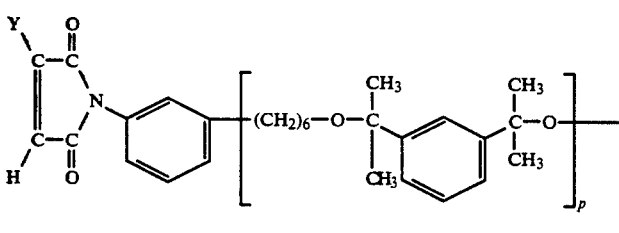

Where: p = 3 or 5

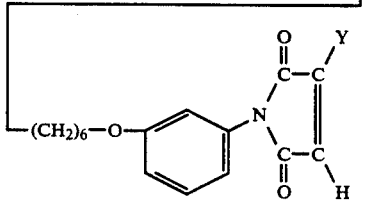

(XVII)

Where: o = 6 or 9
p = 1, 3, or 5

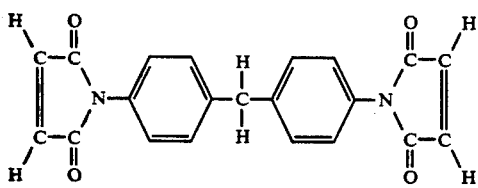

(XVIII)

N,N′,-bismaleimidodiphenyl methane
(Matrimide 5258 from Ciba Giegy Corp.)

The second approach is to end cap a liquid prepolymer with a low molecular weight bismaleimide. The theory being that the end capping groups, although high melting solids, are so small compared to the body of the molecule that they have little effect on the melting point of the total molecule. This proved to be true. The bismaleimides represented by formula (V) and more specifically by formula (XVIII) above are examples of the end capping bismaleimides used.

A number of liquid prepolymers of the general formula (VI) were made from mercaptan terminated polythioethers and polyozythioethers from Products Research & Chemical Corporation by the following method.

PROCEDURE: A solution containing (1.0 mole equivalent) of mercaptan terminated prepolymer, and 1 ml. of triethylamine in dry dimethylformamide (DMF) was added drop wise to a mechanically stirred solution of a bismaleimide (BMI) with the general formula (V) or more specifically formula (XVIII) (2.1 mole equivalent) in dry DMF containing 10% of m-cresol, at 60° C. The mixture was stirred at that temperature for 24 hours, then poured into a 10 to 1 solution of methanol and acetic acid with vigorous stirring. The mixture of solvents were decanted and the viscous polymer product was washed three times with methanol, then dried under reduced pressure. The bismaleimide end capped prepolymer then could be reacted with low molecular dinucleophiles such as DuPont DYTCK A (2-methylpentamethylenediamine). Examples of Products Research Corporation prepolymer blends are:

| | |
|---|---|
| RW-2063-70 | 80% |
| RW-2064-70 | 20% |
| RW-2064-70 | 80% |
| RW-2065-70 | 20% |

RW-2063-70 is a mercaptan terminated polyoxythioether prepolymer with an average molecular weight of 6,500 and an average functionality of 2.75. RW-2064-70 has the same general structure as RW-2063-70 differing only in the molecular weight 2,850 and the functionality 2.0. RW-2065-00 is a short chain dimercaptan with a molecular weight of 154.3, functionality of 2.0, and the formula HSCH$_2$CH$_2$SCH$_2$CH$_2$SH.

Typical nucleophiles used to produce elastomers by reaction with components prepared by endcapping liquid prepolymers were piperazine, 2-methylpiperazine, methylene dianiline, cis-diaminocyclohexane and 1,12-dodecanediamine.

Another useful class of dinucleophiles is biscyclopentadienyl alkanes and, more particularly, cyclopentadienyl alkanes having 1 to 15 carbon atoms in the alkylene bridge between the cyclopentadienyl rings. Biscyclopentadienyl alkanes can be prepared by reacting a cyclopentadienyl sodium salt with a dihalide in a solvent such as THF. These compounds react with bismaleimide, biscitraconimide, and bistriazolinedione terminated prepolymers in a Diels Alder addition with the formation of a polynorbornene elastomer. The basic reaction scheme is shown below.

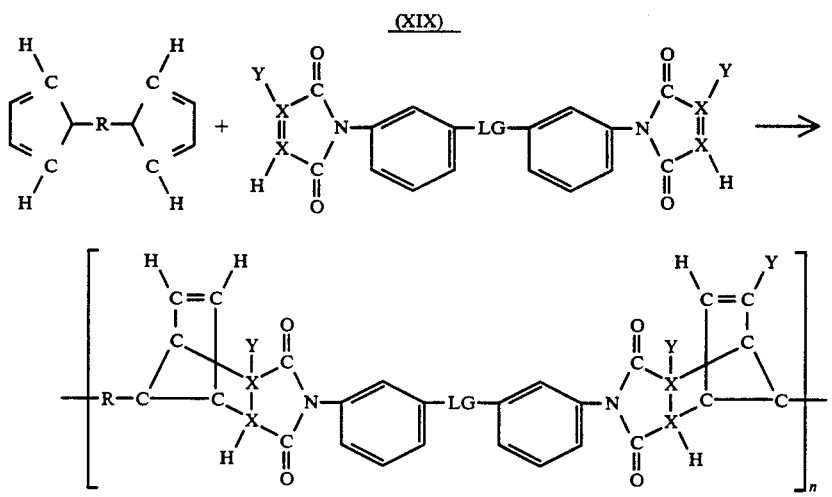

The prepolymers of the present invention can also be reacted with biscyclopentadieneones to produce a thermoplastic polyhydrophthalimide. This reaction is shown below.

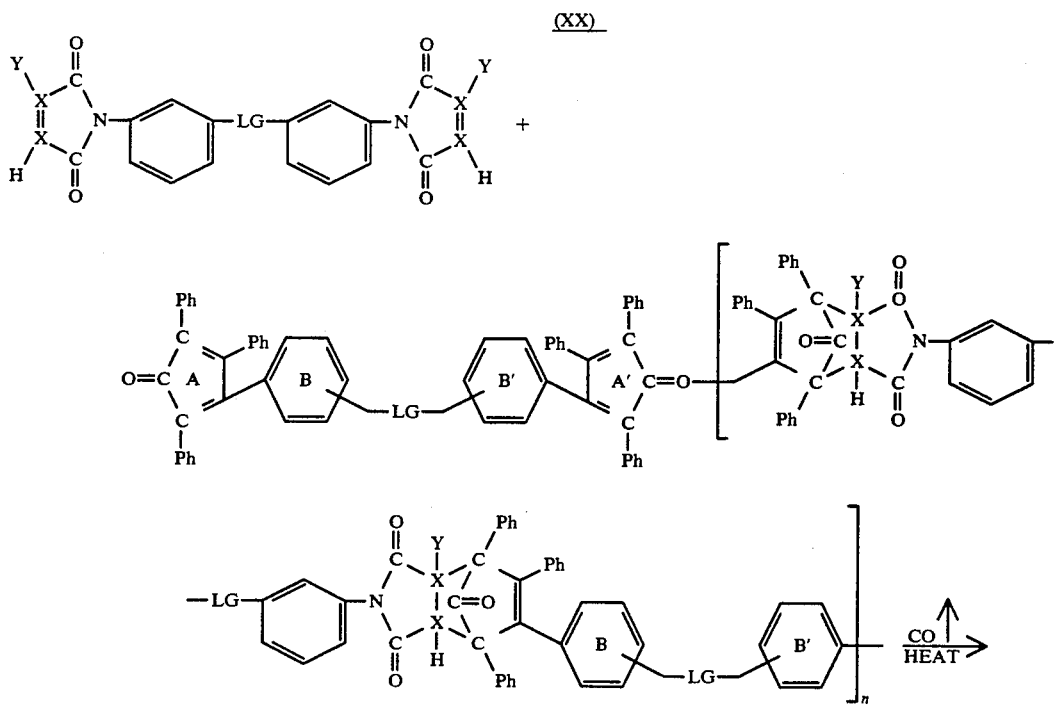

-continued
(XX)

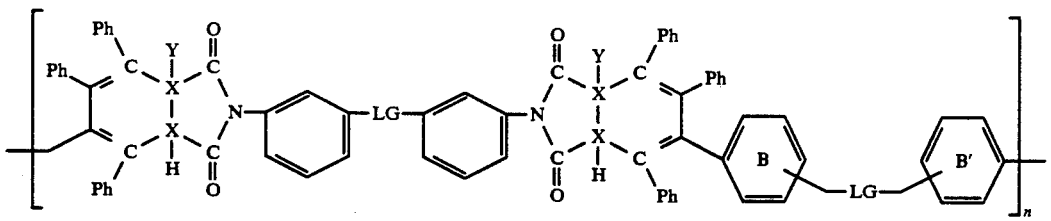

The linking group LG is defined as above and can be attached to the phenyl rings, B and B', in para or meta position, preferably in the meta position.

This reaction is desirable because it proceeds with the loss of carbon monoxide which makes the reaction irreversible.

Biscyclopentadienones can be prepared as illustrated in synthesis Example 5.

SYNTHESIS EXAMPLE 1

Endcapping of Dimercaptans

Dimercaptodiethylsulfide (7.7 gr. or 0.1 mole equivalence) containing a few drops of triethylamine was added drop wise to a solution of (40.0 gr. or 0.22 mole equivalence) of N,N',-bismaleimidodiphenyl methane, Matrimide 5258 available from Ciba Giegy Corp., in 500 ml. of freshly distilled m-cresol. The mixture was stirred at room temperature for 2 hours, then warmed to 60° C. A solution of (303.7 gr. or 0.213 mole equivalence) of RW-2064-70, a mercaptan terminated polythioether prepolymer available from Products Research Corp., in 500 ml. m-cresol was added slowly to the mixture and the resulting mixture was mechanically stirred for 20 to 24 hours at 60° to 70° C., then for an additional 2 hours 100° C. The mixture was cooled to 80° C. and (37.8 gr. or 0.21 mole equivalence) of 1,1'-methylene di 1,4-phylene bis-maleimide was added, then stirred overnight. The resulting mixture was poured into a solution of methanol containing 10% acetic acid in a stainless steel Waring blender and the viscous polymeric material was broken to form a resinous liquid polymer, separated in a separatory funnel from the methanol, the prepolymer was washed three times with methanol, and dried in a rotoevaporator under vacuum at 60° C. for 3 hours.

SYNTHESIS EXAMPLE 2

Endcaping of Dimercaptans

A solution of 0.1 mole equivalent of a mercaptan terminated liquid polymer RW-2066-70, available from Products Research Corp., in 1 liter dry DMF was added dropwise to a mechanically stirred solution of 4,4'-bismaleimidocumyl metabenzene, available from Mitsui Petrochemicals Corp., (2.1 mole equiv.) in dry DMF, containing 10% of m-cresol and 1 ml. of triethylamine, at 60° C.

The mixture was stirred at that temperature for 24 hours, then poured into a 10 to 1 solution of methanol and acetic acid with vigorous stirring. The solvents were decanted from the viscous prepolymer product and washed three times with methanol, then dried in a rotoevaporator under vacuum at 60° C. for 4 hours.

The resulting bismaleimide endcapped prepolymer was reacted with various diamines such as DuPont $C_{12}$ DIAMINE, 1,12-dodecanediamine, or 2-methyl piperazine to yield amorphoruus dark brown to light amber thermoplastic resins.

SYNTHESIS EXAMPLE 3

Preparation of Polyether Diamines

In a 500 ml. round bottom three neck flask out-fitted with a refluxing condenser, mechanical stirrer, and addition separatory funnel was added 150 ml. DMAC, 15.19 gr. of potassium carbonate, and 32.18 gr. of meta chloroaniline. This mixture was stirred and heated to 150° C. After the mixture had a chance to stabilize at 150° C. for 30 minutes 12.43 gr. of hexanediol was added drop wise to the flask over a 1 hour period. The flask was allowed to reflux overnight or 18 hours. The flask was then allowed to cool down to room temperature. The contents were filter and solid potassium carbonate was discarded. The filtrate was then mixed with water and 100 ml. of chloroform. The chloroform diamine layer was washed with water 4 times. The organic layer was then distilled under vacuum. The chloroform and water fractions were discarded, the last fraction was saved. The reaction yield was 83.0% of 6,6'-diamino m-phenoxyhexane. This nucleophilic aromatic substitution reaction was used to make a variety of aromatic and aromatic aliphatic ether diamines.

SYNTHESIS EXAMPLE 4

Preparation of Liquid Bismaleimides

To a vigorously stirred solution of 6,6'-diamino m-phenoxyhexane (0.1 mole) in acetone under a nitrogen atmosphere, maleic anhydride (0.22 mole) was added, the temperature outside being maintained at a constant 20° C. The pale yellow solid of bis-maleic acid soon obtained on addition of maleic anhydride, was vigorously stirred for a further 0.5 hour to complete the reaction. To the continuously stirred suspension of compound in acetone were added acetic anhydride (70 ml., excess) and fused sodium acetate (5 to 6 gr.), and the acetone was allowed to reflux. Refluxing and stirring were continued until the solution became clear (2 to 2.5 hours).

The clear brownish yellow solution was poured into ice water and 100 ml. of chloroform was added and the whole thing was shaken in a separatory funnel. The organic layer was washed with water containing sodium bicarbonate 4 times by shaking it in a separatory funnel. The organic layer was then passed through a filtration chromatography column containing silica gel. The chloroform was then removed by distillation under vacuum in a rotoevaporator. The resulting 6,6'-bismaleimido m-phenoxyhexane is a yellowish orange viscous liquid at room temperature.

SYNTHESIS EXAMPLE 5

Preparation of the Biscyclopentadieneone

A mixture of meta-dibromobenzene (1 mole), triphenyl phosphine (20 gr.), copper iodide (3 gr.), and palladium (II) acetate (1 gr.), in 1 liter of dry triethylamine is heated and stirred at 100° C. Phenylacetylene (2.5 moles), is added slowly and the resulting mixture is refluxed for 8 hours. The mixture is cooled and the solid product washed with ether, then with water, and methanol. The product I, is then air-dried and used in the next step.

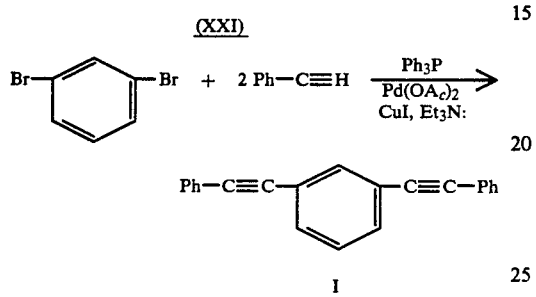

A mixture of potassium permanganate (3 mole), 1,4-bis(phenylethynyl)arene, product I (1 mole), water (6 liters), methylene chloride (5 liters), acetic acid (400 ml.), and phase transfer agent (Adogen 464 methyltrialkyl ($C_8$-$C_{10}$)-ammonium chloride available from Aldrich Chemical Co.) is mechanically stirred and refluxed for 6 hours. After cooling, sodium-hydrogensulfite (20 gr.) is added slowly to reduce any unreacted permanganate. After 15 minutes the solution is acidified with 1 liter of concentrated hydrochloric acid and the precipitated manganese dioxide is reduced by addition of excess concentrated sodium hydrogensulfite solution. The aqueous phase is separated and extracted with dichloromethane (3 liters). The combined organic layer is washed with 5% sodium hydroxide solution, dried magnesium sulfate, filtered, and concentrated to give the produce II.

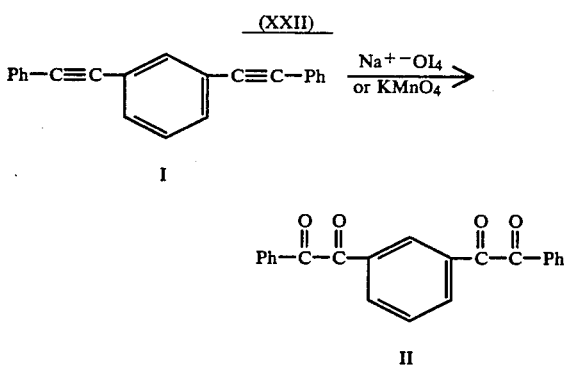

A one mole equivalent sample of product II and two mole equivalent of dibenzylketone is heated for 4 hours in a mechanically stirred dichlorobenzene solution. The mixture is diluted with addition of hexane and the solid product is filtered, washed with hexane and dried. Purification of this product may be carried out by recrystallization from acetone or methyl ethyl ketone.

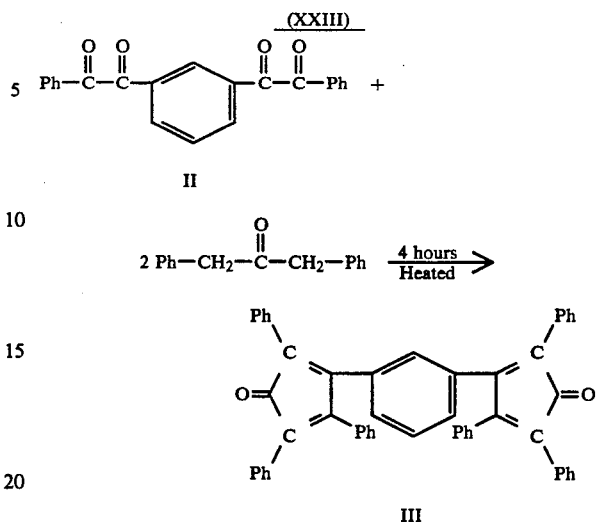

Where: Ph = phenyl rings

SYNTHESIS EXAMPLE 6

Preparation of Biscyclopentadienyl Alkane

To a solution of sodium cyclopentadienyl (2 mole equivalence), in dry tetrahydrofuran (THF) under nitrogen atmosphere and ice bath temperature, is added drop wise a solution of 1,6-dibromohexane, selected from those with the general form shown below, (1 mole equivalence), in dry THF. When the addition is complete, the mixture is stirred at 5° to 10° C. for 6 to 22 hours. The resulting solution is poured into an ice-cold dilute hydrochloric acid (5%) and the product is isolated by filtration or extraction.

SYNTHESIS EXAMPLE 7

Preparation of Activated Bisvinylketone

To a solution of suberoyl chloride, $ClCO(CH_2)_6COCl$, (1 mole equivalence) and aluminum chloride (2.2 mole equivalence) in methylene chloride at 0° C., is added drop wise a solution of trimethylvinyl silane (2.4 mole equivalence) in methylene chloride. The mixture is stirred at 0° to 5° C. for 6 to 10 hours, then poured in ice-cold 10% hydrochloric acid. The mixture is shaken in a separatory funnel, methylene chloride layer is washed with water, dried (MgSO4). The solution is then filtered and the methylene chloride is distilled under vacuum in a roteovaporator at 50° C. to give bisvinylketone product.

Having described the invention in detail and by reference to specific embodiments thereof, it will be apparent that numerous modifications are possible without departing from the spirit of the invention as defined in the following claims.

What is claimed is:

1. A thermoplastic polymer having a repeating unit of the formula:

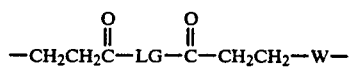

where LG is a linking group and W is an oligomeric chain selected from the group consisting of a polyether, a polythioether, a polyetherthioether, a polycarbonyl, a polysulfonyl, and copolymers thereof.

2. The polymer of claim 1 wherein LG is a group of the formula:

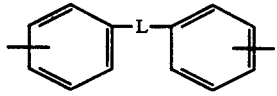

where L represents a flexible linking group.

3. The polymer of claim 2 wherein L is selected from the group consisting of:

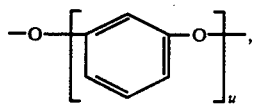

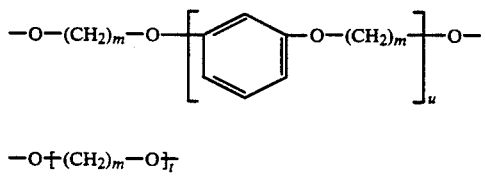

$-O \pm (CH_2)_m - O \pm_t$ where u is 1 to 7, t is 1 to 5, and m is 1 to 12.

4. The polymer of claim 3 wherein W is represented by the formula:

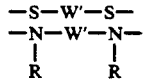

where R is a lower alkyl group, and W' is a straight or branched chain polyether, polythioether, or polyetherthioether chain.

5. The polymer of claim 4 wherein W' includes a repeating unit selected from the group consisting of:

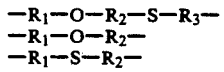

where $R_1$, $R_2$, and $R_3$ are the same or different and represent a straight or branched chain alkylene group having 2 to 12 carbon atoms, an m-phenylene group or a p-phenylene group.

6. The polymer of claim 4 wherein W is represented by the formula:

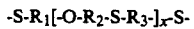

or the formula:

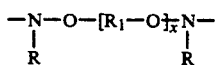

where x is 2 to 80, R represents an alkyl group, and $R_1$, $R_2$, $R_3$ are the same or different and represent a straight or branched chain alkylene group having 2 to 12 carbon atoms, an m-phenylene group of a p-phenylene group.

* * * * *